United States Patent Office 3,642,898
Patented Feb. 15, 1972

3,642,898
1-DIMETHYLAMINO - 3 - METHYL-[2' (OR 4')-ALKOXY-3' (OR 5')-HALOGENO] - 2-PHENYL PENTANES
Jeannine A. Eberle, Chatou, Micheline Y. Sergant, Clamart, Claude P. Fauran, Paris, and Gerard J. Huguet, Malesherbes, France, assignors to Delalande S.A., Courbevoie, Hauts-de-Seine, France
No Drawing. Continuation-in-part of applications Ser. No. 686,722, Nov. 29, 1967, and Ser. No. 780,914, Dec. 3, 1968, now Patent No. 3,573,304, dated Mar. 30, 1971. This application May 28, 1969, Ser. No. 828,790
Claims priority, application France, Jan. 28, 1969, 6901604
Int. Cl. C07c 87/28
U.S. Cl. 260—570.8 R        3 Claims

ABSTRACT OF THE DISCLOSURE

A compound of the formula:

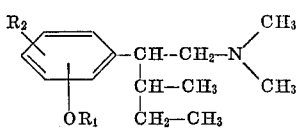

in which $R_1$ is an alkyl radical having 1 to 5 carbon atoms, and $R_2$ is a halogen, having diuretic and hypotensive properties. It is prepared by reacting $LiAlH_4$ in anhydrous ether or tetrahydrofuran with an amide of the formula:

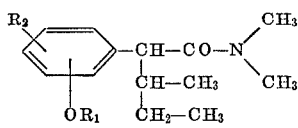

in which $R_1$ and $R_2$ have the same meaning as above.

CROSS REFERENCES TO RELATED APPLICATIONS

This application is a continuation-in-part of our copending applications, Ser. No. 686,722, filed Nov. 29, 1967 and Ser. No. 780,914, filed Dec. 3, 1968, now Pat. No. 3,573,304, issued Mar. 30, 1971.

The parent patent has for its object novel N-substituted amides, their corresponding amines and their process of preparation.

More particularly, the parent patent relates to compounds of the general formula:

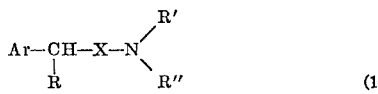

in which:

Ar represents a hydrogen atom, an aromatic radical such as a phenyl, α-naphthyl or β-naphthyl radical which may be substituted by one or more low-molecular weight radicals selected from amino, nitro, chloro or low molecular weight alkoxy radicals or a heterocyclic radical such as a thienyl, furyl, quinolyl, benzimidazolyl, pyridyl, pyrazinyl or pyrimidinyl radical;

R represents a straight or branched-chain, saturated or unsaturated aliphatic radical having 1 to 5 carbon atoms which radical may be substituted, for example by at least one ethoxy, dimethylamino or hydroxy radical;

R' and R" each represent a hydrogen atom or an aliphatic radical having 1 to 3 carbon atoms, or R' and R" together with the nitrogen atom may form a heterocyclic radical, such as a piperidino, morpholino or pyrrolidino radical, and X represents a carbonyl group —CO—, or a methylene group —$CH_2$—, in which case Ar may represent a cycloaliphatic radical, such as a cyclohexyl or cyclopentyl radical.

The present invention relates to novel compounds of the general Formula 1, in which:

Ar represents a polysubstituted phenyl radical;
R represents a secondary butyl radical;
R' and R" each represent a methyl radical; and X represents a methylene group.

More particularly, the compounds of the present invention are 1-dimethylamino-3-methyl-[2' (or 4')-alkoxy-3' (or 5')-halogeno]-2-phenyl pentanes of the general formula:

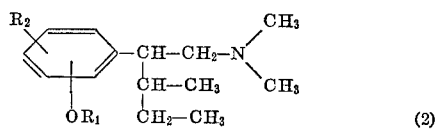

in which:

$R_1$ represents an alkyl radical having 1 to 5 carbon atoms, and
$R_2$ represents a halogen atom, such as a fluorine or chlorine atom.

The process for obtaining the compounds of the general Formula 2 comprises reducing by the action of lithium aluminium hydride $LiAlH_4$, in anhydrous ether or tetrahydrofuran, the amides of the general formula:

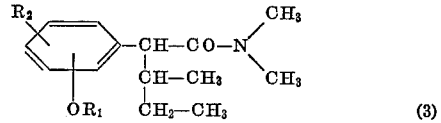

in which:

$R_1$ and $R_2$ have the same significance as in the general Formula 2.

The general method of preparation is as follows:

Into a 500 ml. reaction vessel having stirring means, ampoule introduction means and refrigerant reflux means, 150 ml. of anhydrous ether are introduced followed by 0.1 mol. of $LiAlH_4$ (3.8 g.). The suspension of $LiAlH_4$ is agitated and then there is added, drop by drop, in a manner to obtain an ether reflux, a solution of 0.1 mol. of an amide of the Formula 3 in 50 to 55 ml. of anhydrous ether. The reaction mixture is maintained for 4 hours under reflux once the addition of the amide of the Formula 3 has finished. The mixture is then hydrolysed, after cooling, by the successive additions of 4 ml. of water, 3 ml. of 20% sodium hydroxide and 14 ml. of water. The granular precipitate obtained is filtered and washed with ether. The filtrate is concentrated, acidified with 4 N HCl, the aqueous phase is separated, alkalinised with 4 N NaOH and extracted with ether. The product is then dried and evaporated. The oily residue obtained is purified by distillation under reduced pressure.

The base so obtained, in solution in ethanol or ethyl acetate is converted into the hydrochloride by bubbling in gaseous HCl. The crystallized hydrochloride is dried, washed, dried again and then recrystallized.

The following compounds, given by way of non-limitative examples, have been prepared according to the above procedure.

EXAMPLE 1

1-dimethylamino-3-methyl-(5'-fluoro-2'-methoxy)-2-phenyl pentane

Boiling point=97° C. under 0.2 mm. Hg
Yield=72%
Melting point of hydrochloride formed after dissolving the base in an ethanol-ethyl acetate mixture=155° C.
Empirical formula=$C_{15}H_{25}ClFNO$

*Elementary analysis.*—Calculated (percent): C, 62.15; H, 8.70; Cl, 12.23; F, 6.56; N, 4.83. Found (percent): C, 62.06; H, 8.58; Cl, 12.18; F, 6.36; N, 4.76.

EXAMPLE 2

1-dimethylamino-3-methyl (5'-chloro-2'-ethoxy) 2-phenyl pentane

Boiling point=110–112° C. under 0.1 mm. Hg
135–136° C. under 0.5 mm. Hg
Yield=72%
Empirical formula=$C_{16}H_{26}ClNO$

*Elementary* analysis.—Calculated (percent): C, 67.70; H, 9.23; Cl, 12.49; N, 4.94. Found (percent): C, 67.64; H, 8.99; Cl, 12.23; N, 5.11.

Melting point of hydrochloride formed after dissolution of the base in ethyl acetate=140° C.
Empirical formula=$C_{16}H_{27}Cl_2NO$

*Elementary analysis.*—Calculated (percent): C, 59.99; H, 8.50; Cl, 22.14; N, 4.37. Found (percent): C, 59.80; H, 8.47; Cl, 22.18; N, 4.19.

EXAMPLE 3

1-dimethylamino-3-methyl-(3'-chloro-4'-methoxy)-2-phenyl pentane

Boiling point=121° C. under 0.1 mm. Hg
Yield=48%
Melting point of hydrochloride formed after dissolution of the base in an ethanol-isopropyl ether mixture=191° C.
Empirical formula=$C_{15}H_{25}Cl_2NO$

*Elementary analysis.*—Calculated (percent): C, 58.82; H, 8.23; Cl, 23.15; N, 4.57. Found (percent): C, 58.67; H, 8.18; Cl, 23.28; N, 4.56.

EXAMPLE 4

1-dimethylamino-3-methyl-(3'-chloro-4'-ethoxy)-2-phenyl pentane

Boiling point=136° C. under 0.2 mm. Hg
Yield=82%
Empirical formula=$C_{16}H_{26}ClNO$

*Elementary analysis.*—Calculated (percent): C, 67.70; H, 9.23; Cl, 12.49; N, 4.94. Found (percent): C, 67.06; H, 9.33; Cl, 12.28; N, 5.12.

Melting point of hydrochloride=178–180° C. with decomposition
Empirical formula=$C_{16}H_{27}Cl_2NO$

*Elementary analysis.*—Calculated (percent): C, 59.99; H, 8.50; Cl, 22.14; N, 4.37. Found (percent): C, 60.01; H, 8.39; Cl, 22.19; N, 4.37.

EXAMPLE 5

1-dimethylamino-3-methyl-(2'-ethoxy-5'-fluoro)-2-phenyl pentane

Boiling point=105° C. under 0.2 mm. Hg
Yield=75%
Empirical formula=$C_{16}H_{26}FNO$

*Elementary analysis.*—Calculated (percent): C, 71.87; H, 9.80; N, 5.24. Found (percent): C, 71.92; H, 9.59; N, 5.44.

Melting point of hydrochloride formed after dissolution of the base in an ethanol-ethyl acetate mixture=148° C.
Empirical formula=$C_{16}H_{27}ClFNO$

*Elementary analysis.*—Calculated (percent): C, 63.24; H, 8.96; N, 4.61. Found (percent): C, 63.24; H, 9.05; N, 4.62.

EXAMPLE 6

1-dimethylamino-3-methyl-(2'-propoxy-5'-chloro)-2-phenyl pentane

Boiling point=137° C. under 0.2 mm. Hg
Yield=60%
Empirical formula=$C_{17}H_{27}ClNO$

*Elementary analysis.*—Calculated (percent): C, 68.55; H, 9.48; Cl, 11.90; N, 4.70. Found (percent): C, 68.80; H, 9.65; Cl, 12.07; N, 4.85.

Melting point of hydrochloride=116° C.
Empirical formula=$C_{17}H_{28}Cl_2NO$

*Elementary analysis.*—Calculated (percent): C, 61.07; H, 8.74; Cl, 21.21; N, 4.19. Found (percent): C, 61.01; H, 8.91; Cl, 21.10; N, 4.17.

EXAMPLE 7

1-dimethylamino-3-methyl(3'-chloro-4'-propoxy)-2-phenyl pentane

Boiling point=144° C. under 0.3 mm. Hg
Yield=67%
Empirical formula=$C_{17}H_{28}ClNO$

*Elementary analysis.*—Calculated (percent): C, 68.55; H, 9.48; Cl, 11.90; N, 4.70. Found (percent): C, 69.14; H, 9.38; Cl, 11.68; N, 4.73.

Melting point of hydrochloride formed after dissolution of the base in an ethanol-isopropyl ether mixture=177° C.
Empirical formula=$C_{17}H_{29}Cl_2NO$

*Elementary analysis.*—Calculated (percent): C, 61.07; H, 8.74; Cl, 21.21; N, 4.19. Found (percent): C, 60.87; H, 8.56; Cl, 21.34; N, 4.11.

EXAMPLE 8

1-dimethylamino-3-methyl-(4'-butoxy-3'-chloro)-2-phenyl pentane

Boiling point=152° C. under 0.3 mm. Hg
Yield=60%
Empirical formula=$C_{18}H_{30}ClNO$

*Elementary analysis.*—Calculated (percent): C, 69.31; H, 9.70; Cl, 11.37; N, 4.49. Found (percent): C, 69.52; H, 9.73; Cl, 11.36; N, 4.52.

Melting point of hydrochloride formed after dissolution of the base in an isopropyl alcohol-isopropyl ether mixture=160° C.
Empirical formula=$C_{18}H_{31}Cl_2NO$

*Elementary analysis.*—Calculated (percent): C, 62.06; H, 8.97; Cl, 20.36; N, 4.02. Found (percent): C, 62.23; H, 8.91; Cl, 20.64; N, 3.99.

EXAMPLE 9

1-dimethylamino-3-methyl-(2'-butoxy-5'-chloro)-2-phenyl pentane

Boiling point=142–145° C. under 0.13 mm. Hg
Melting point of hydrochloride formed after dissolution of the base in acetone=147° C.
Empirical formula=$C_{18}H_{31}Cl_2NO$

*Elementary analysis.*—Calculated (percent): C, 62.06; H, 8.97; Cl, 20.36; N, 4.02. Found (percent): C, 62.06; H, 8.93; Cl, 20.49; N, 4.05.

EXAMPLE 10

1-dimethylamino-3-methyl-(3'-fluoro-4'-methoxy)-2-phenyl pentane

Boiling point=116–119° C. under 0.3 mm. Hg
Yield=51%
Melting point of hydrochloride=184–187° C.
Empirical formula=$C_{15}H_{25}ClFNO$

*Elementary analysis.*—Calculated (percent): C, 62.16; H, 8.70; N, 4.83. Found (percent): C, 62.22; H, 8.61; N, 4.72.

EXAMPLE 11

1-dimethylamino-3-methyl-(4'-ethoxy-3'-fluoro)-2-phenyl pentane

Boiling point=118–120° C. under 0.2 mm. Hg
Yield=50%
Melting point of hydrochloride=174–175° C.
Empirical formula=$C_{16}H_{27}ClFNO$

*Elementary analysis.*—Calculated (percent): C, 63.24; H, 8.96; Cl, 11.67; N, 4.61. Found (percent): C, 63.37; H, 8.94; Cl, 11.41; N, 4.70.

The new amines, studied on animals in the laboratory, have shown interesting diuretic and hypotensive properties.

The diuretic activity has been shown by studies of rats and dogs after oral administration of the new compounds of the invention. They preferentially act on the urinary elimination of water and sodium and chlorine ions, whereas the elimination of the potassium ions remains weak. The diuretic activity has been evaluated by discovering the dose, which, when administered, doubles the volume of urinary elimination over the period of six hours following the treatment, effected simultaneously with a surcharge of 25 ml./kg. of an isotonic solution of NaCl (DE=100%).

The hypotensive activity has been shown, as evidenced by the intravenous administration in the cat, the dog, the rabbit and the anaesthetised rat, and evaluated by discovering the dose which, when administered, provokes a lowering of the arterial pressure by 50%.

The results of these tests, effected with each of the compounds listed above, together with their toxicity are set forth in the following table:

GENERAL FORMULA

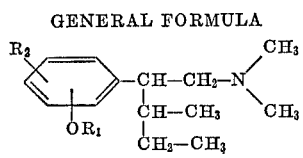

| $OR_1$ | $R_2$ | Acute toxicity | | Diuretic action (DE 100% p.o.) rat, mg./kg. | Hypotensive dose, 50% (i.v.) cat, mg./kg |
|---|---|---|---|---|---|
| | | DL 50 i.v. mouse, mg./kg. | DL 50 p.o. rat, mg./kg. | | |
| 2-OCH₃ | 5-F | 18 | 500 | 15 | 2 |
| 2-OC₂H₅ | 5-Cl | 16.5 | 560 | 10 | 1.5 |
| 4-OCH₃ | 3-Cl | 37 | 400 | 50 | 4 |
| 4-OC₂H₅ | 3-Cl | 30 | 400 | 25 | 5 |
| 2-OC₂H₅ | 5-F | 11 | 285 | 12.5 | 2.5 |
| 2-OC₃H₇ | 5-Cl | 22.5 | | 12.5 | 2.5 |
| 4-OC₃H₇ | 3-Cl | 47 | 660 | 50 | 5 |
| 4-OC₄H₉ | 3-Cl | 33 | 940 | >50 | 2.5 |
| 2-OC₄H₉ | 5-Cl | 20 | | 12.5 | 1.5 |
| 4-OCH₃ | 3-F | 39 | | 50 | 4 |
| 4-OC₂H₅ | 3-F | 39 | | 50 | 4 |

As can be seen from the table, for the same method of administration, the difference between the effective dose and the lethal dose is sufficiently large to enable the novel amines of the invention to be utilised in human therapeutics.

Preferably, the compounds are administered in a dose between 5 and 100 mg./day.

What we claim is:
1. 1-dimethylamino-3-methyl-[2' (or 4')-alkoxy-3'- (or 5')-halogeno]-2-phenyl pentanes of the general formula:

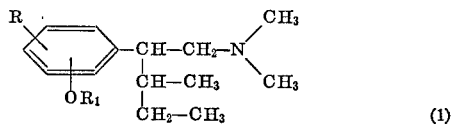

in which:

$R_1$ represents an alkyl radical having 1 to 5 carbon atoms; and $R_2$ represents a halogen atom.

2. Compounds according to claim 1, in which $R_1$ represents a methyl, ethyl, propyl or butyl radical.

3. Compounds according to claim 1, in which $R_2$ represents a chlorine or fluorine atom.

References Cited

UNITED STATES PATENTS 2,863,921  12/1958  Stuhmer et al. ____ 260—570.8
3,400,155  9/1968  Ehrhart et al. ____ 260—570.8 X
3,409,671  11/1968  Ehrhart et al. ____ 260—570.8 X ROBERT V. HINES, Primary Examiner U.S. Cl. X.R.

260—247, 247.5 (R), 247.7 (A), 268 (FT), (H), (BQ), (R), 288 (A), 293 (D), 294.7 (G), (M), 296 (D), 296 (R), 297 (R), 309.2, 326.5 (J), 326.8, 326.85, 329 (AM), 346.11, 558 (B), 559 (R), 563 (R), 570.5 (C); 424—330